Feb. 17, 1931. J. F. RUNGE 1,793,018
GRAIN CLEANER
Filed Oct. 10, 1928
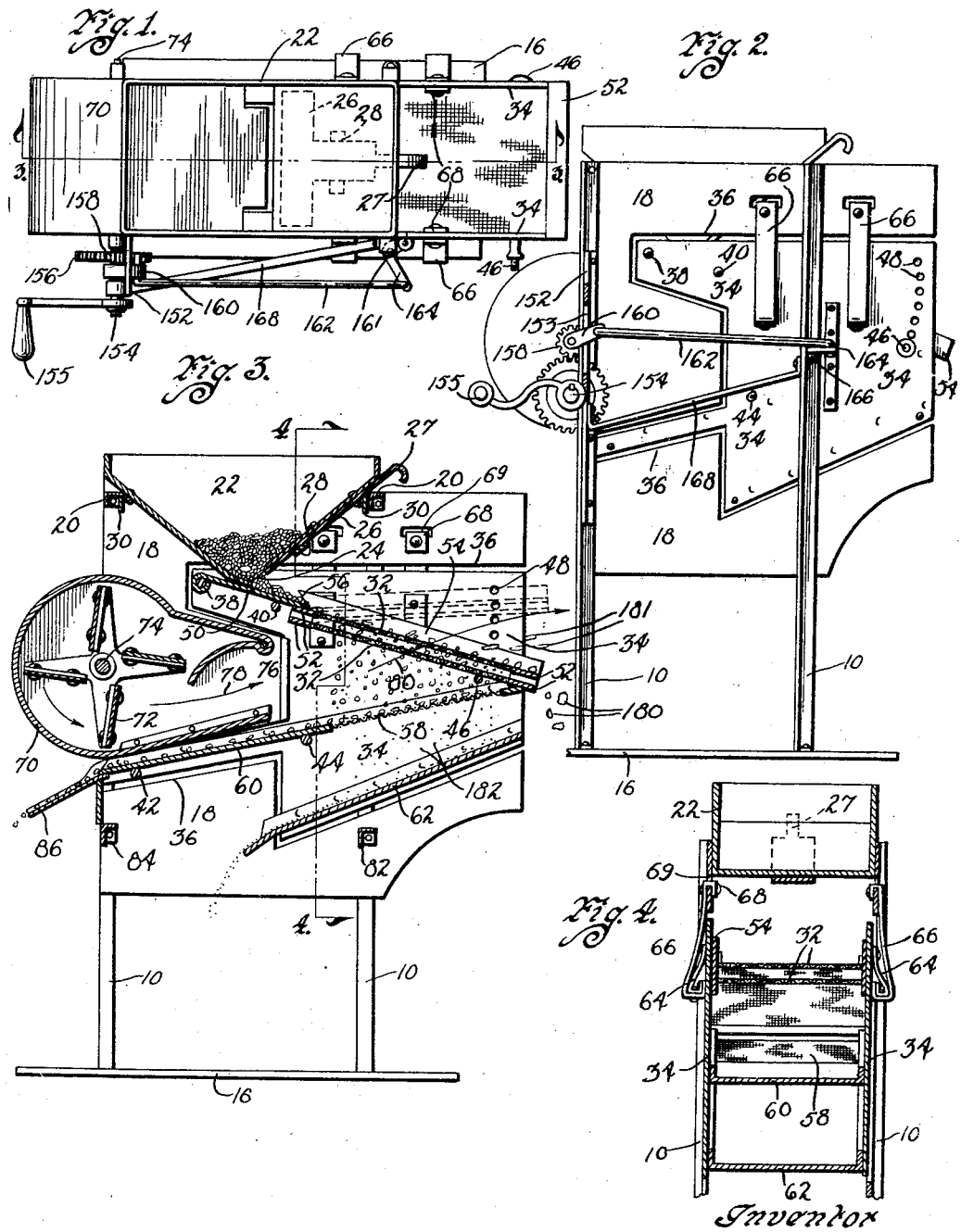

Patented Feb. 17, 1931

1,793,018

UNITED STATES PATENT OFFICE

JOHN F. RUNGE, OF SPENCER, IOWA

GRAIN CLEANER

Original application filed February 27, 1928, Serial No. 257,238. Divided and this application filed October 10, 1928. Serial No. 311,527.

The object of my present invention is to provide a cleaner of simple, durable and inexpensive construction, this application being a division of my copending application, filed February 27, 1928, Serial Number 257,238.

It is my purpose to provide such a grain cleaner that can be made in different sizes for hand and power operation and for cleaning a great variety of seeds or grain in such quantities as may be desired.

Another object of my invention is to provide a grain cleaner in which shaker screens are utilized for receiving the grain and removing dirt and other foreign matter therefrom.

Still a further object is to provide a fan mechanism in connection with the shaker screens for the purpose of blowing light trash such as straw and weeds from the grain as it is being cleaned.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a top plan view of a grain cleaner embodying my invention.

Figure 2 illustrates a side elevation of the same.

Figure 3 is a detail sectional view taken on the line 3—3 of Figure 1 and illustrates the various shaker screens and other parts of my device; and Figure 4 is a detail sectional view taken on the line 4—4 of Figure 3 to illustrate the movable supporting mechanism for the shaker screen assembly.

My improved grain cleaner mechanism consists of suitable supporting frame members in the form of uprights indicated generally by the reference character 10 of which there are four arranged preferably in a square.

The whole device may or may not be provided with a base 16.

Suitably supported on the upright members 10 are laterally spaced side plates 18, which form casing members for the shaker screen assembly. Extending across the device between the upper parts of the side members 18 are cross bars 20, which detachably support the hopper 22. The hopper 22 has in its bottom a discharge opening 24.

For adjustably controlling the size of the opening 24, I provide a closure member 26, having a handle 27 slidably mounted in a guide 28. Secured to the under side of the hopper 22 are angle bars 30, which coact with the cross bars 20 for holding the hopper in proper position.

The controlling handle 27 is also slidably mounted between one of the bars 30 and the bottom of the hopper 22.

Arranged to receive grain or seed discharged from the opening 24 in the hopper 22, I provide shaker screens 32, which are part of a shaker screen assembly, which will now be described.

This assembly comprises a pair of spaced side wall members 34 of the peculiar shape shown in Figures 2 and 3, inset in corresponding openings 36 in the respective side wall members 18 for lateral reciprocation.

The side wall members 34 are connected by cross rods 38, 40, 42, 44 and 46. The rod 46 is mounted at the front of the machine and may be arranged in any one of a series of laterally spaced pairs of holes 48.

Pivoted to the rod 38 is a hinged deck or chute member 50, which is inclined downwardly and forwardly and normally has its forward end resting on the rod 40, as shown in Figure 3.

The deck 50 stands normally just below the discharge opening 24 at the bottom of the hopper 22.

I provide detachably mounted shaker screens 32, already referred to. These screens are made in a unit, comprising a pair of superposed spaced, screen members carried by a frame, having the transverse elements 52 and the longitudinal frame members 54.

The rearward ends of the side members 54 have notches 56 (see Figure 3), which receive the forward edge of the deck 50 and the forward end of the shaker screen unit rests on the rod 46.

I find that the shaker screen assembly can be held by friction between the walls 34 against accidental displacement, but other fastening means may be employed if necessary, for instance by connecting the side members 54 of the shaker screen unit with the deck member 50.

The deck member 50 and the shaker screens are ordinarily used in such an arrangement that they are inclined from the rod 38 downwardly and forwardly in the machine.

Arranged below the shaker screen and inclined from the forward end of the machine downwardly and rearwardly is a cross screen 58 from which grain or the like is discharged upon a solid bottom member 60 extended from the lower rearward end of the screen 58 substantially in the same plane rearwardly and downwardly, as shown in Figure 3.

Below the screen 58 is an inclined bottom member 62, arranged between the side walls 34 for discharging dirt and very small seed and the like.

The shaker screen unit is mounted for lateral reciprocation in the following manner:

On the outer surfaces of the side walls 34 are mounted projecting members 64. Flat resilient members 66 are hung on the side members 18, as by means of hook-shaped portions 68 projecting through slots 69 and thence inclined downwardly and outwardly, as shown in Figure 4, and around the outer portions of the members 64 and thence inwardly laterally toward and preferably to the walls 34.

The lower parts of the spring members 66 may be secured to the members 64 or to the walls 34 or to both. Their resiliency tends to hold the shaker screen unit at its central position.

The mechanism for reciprocating the shaker screen unit will be hereinafter described.

Located rearwardly and below the discharge opening 24 of the hopper 22 is a fan casing 70, in which a fan 72 is mounted on a transversely supported shaft 74.

The fan casing 70 has a discharge mouth 76 located slightly forwardly with relation to and below the opening 24 in such manner as to discharge forwardly and slightly upwardly in the machine as indicated by the arrows at 78 and 80.

The forward supporting members 10 are connected by an angle iron brace 82 and the rearward members 10 are supported by an angle iron brace 84.

Suitably supported on the frame of the machine at the discharge end of the bottom member 60 is a short chute 86, which may be used for discharging the cleaned grain from the machine into suitable receptacles or into a grain grading device such as the rotary type of grading cones illustrated in my copending application hereinbefore referred to.

I shall now describe the gearing connections for my improved grain cleaner. Supported on the frame of the machine as shown in Figures 1 and 2 is a bracket 152 which is illustrated partially in section in Figure 2 for the purpose of showing a slot 153 therein.

Suitably mounted on the bracket 152 and the frame of the machine is a stub shaft 154 on the outer end of which is a crank handle 155. On the shaft 154 is a gear 156 which meshes with a small pinion 158 on the fan shaft 74. It will thus be seen that by rotating the shaft 154 through the operation of the crank handle 155 or from any other desirable source of power, rotation will be imparted through the gear and pinion 156 and 158 to the fan shaft 174 and the fan 72 within the fan casing 70.

On the shaft 74 is a short arm 160 to which is pivoted one end of a pitman 162 projecting forwardly in the machine. The short arm 160 rotates during part of a revolution through the slot 153 in the bracket 152.

The central portion of a bell crank lever 164 is pivoted as at 166 on the frame of the machine adjacent to the shaker screen unit already described. The forward end of the pitman 162 is pivoted to one arm of the bell crank lever 164 and the other arm of that lever is pivoted to one of the walls 34 of the shaker screen assembly.

The member 168 is a brace for the bracket 152.

I shall now describe somewhat in detail the operation of my improved machine.

Assuming that a certain kind of seed is to be cleaned, for example, wheat, the operator, as result of his experience, adjusts the closure member 26 for fixing the size of the opening 24 for the proper discharge of wheat to the machine. He then selects the proper shaker screens for wheat and mounts them in the shaker screen assembly.

Then he adjusts the forward ends of the shaker screens by raising or lowering the rod 46 and inserting it in the proper holes 48.

Grain is supplied to the hopper 22 and when the shaft 154 is rotated, motion will be imparted to the shaft 74. The fan is thus operated for blowing a blast of air from the fan casing through the screens 32 as indicated by the arrows at 78 and 80. The rotation of the shaft 74 also imparts reciprocating movement to the pitman 162 for reciprocating the bell crank lever 164 (see Figures 1 and 2)

and thus imparting to the shaker screen unit a lateral, reciprocating movement.

The lateral shaking movement of the shaker screens agitates the grain at the discharge end of the hopper and causes the grain to travel downwardly over the deck 50 and the shaker screens 32. The very coarse content indicated as at 180 (Figure 3) passes over the screens 32 and is discharged. Likewise the air blast will blow out fine dust and like articles, such as straw 181.

All the grain, including dirt, dust, and fine seed, passes downwardly through the screens 32 and drops upon the screen 58, which permits fine dirt and very small seeds to drop through, as indicated at 182.

The fine dirt drops upon the member 62 and is discharged.

The remaining seed travels rearwardly and downwardly on the screen 58 to the bottom or chute member 60 and is discharged down the chute 86 to a receptacle or to a grading device as hereinbefore indicated.

It will be seen from the foregoing that I have provided a comparatively simple machine which can be used in large or small sizes for hand or power operation. By changing the shaker screens the machine may be used for cleaning clover seed, wheat or many other kinds of seeds.

A plurality of cleaner screens 32 may be provided having screen portions of different mesh for the different kinds of grain or seed. With a little experience I find that seed can be cleaned very effectively.

A machine of this kind can be made in sizes for use on an ordinary farm where it can be used for cleaning all kinds of grain and seeds produced on the farm.

The details of the construction and arrangement of the various parts of my improved grain cleaning machine may be considerably changed without departing from the real spirit and purpose of my invention, and it is my intention to cover by my claims, any modified forms of structure or use of mechanical equivalents, which may be reasonably included within their scope.

I claim as my invention:

1. In a grain cleaner, side walls, a shaker member and means for movably supporting the shaker member relative to said side walls, said means comprising resilient bars hooked at their upper ends, openings in said side walls for said hooks and means at the lower ends of said bars for fastening them to said shaker member, said last means comprising bars fastened at their upper ends to said shaker member, extending downwardly and outwardly from such fastening, then extending inwardly and having their free ends fastened to said shaker member, said first mentioned bars being bent outwardly and extending over the outwardly and downwardly and the inwardly extended parts of said last mentioned bars.

2. In a grain cleaner, walls, a shaker member and means for movably supporting the shaker member relative to said walls, said means comprising resilient bars connected at their upper ends with said walls and means at the lower ends of said bars for fastening them to said shaker member, said last means comprising bars fastened at their upper ends to said shaker member, extending downwardly and outwardly from such fastening, then extending inwardly and having their free ends fastened to said shaker member, said first mentioned bars being bent outwardly and extending over the outwardly and downwardly and the inwardly extended parts of said last mentioned bars.

Des Moines, Iowa, September 29, 1928.

JOHN F. RUNGE.